J. A. BEDDINGFIELD.
AUTOMOBILE TIRE RIM.
APPLICATION FILED MAR. 7, 1921.
1,408,165.
Patented Feb. 28, 1922.
2 SHEETS—SHEET 1.
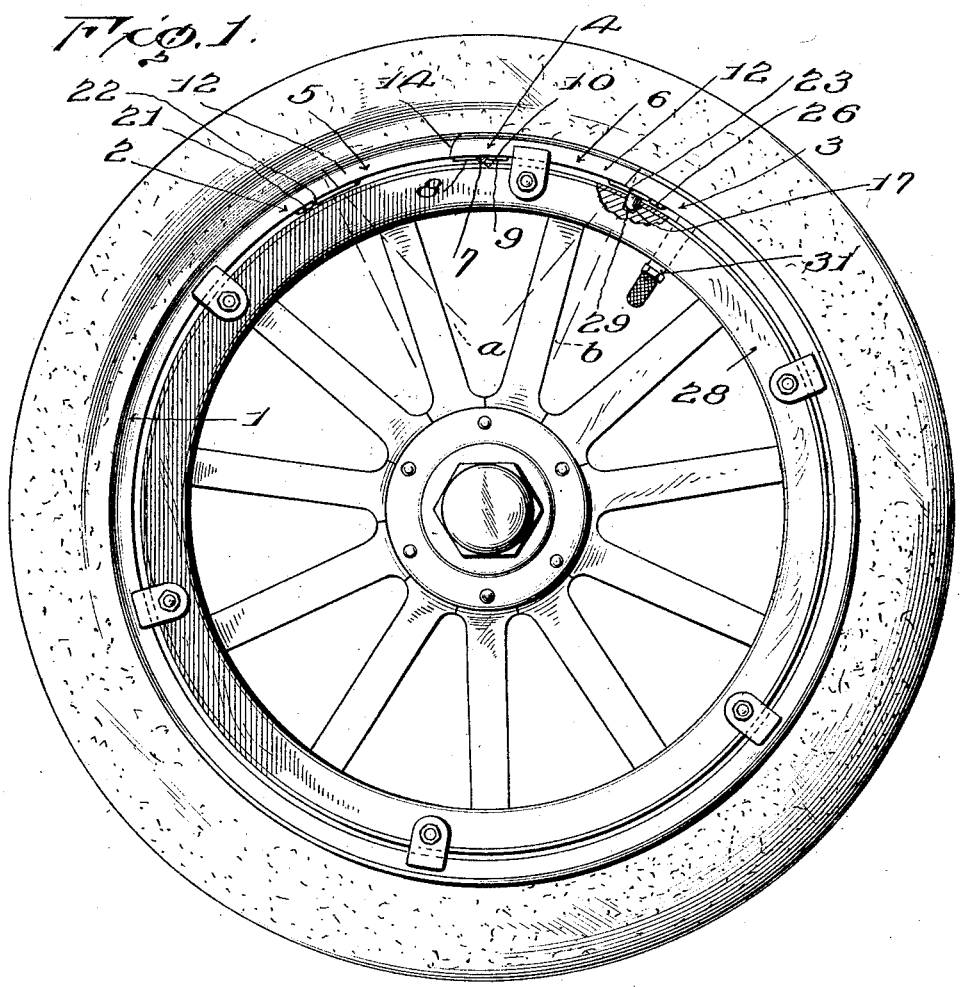
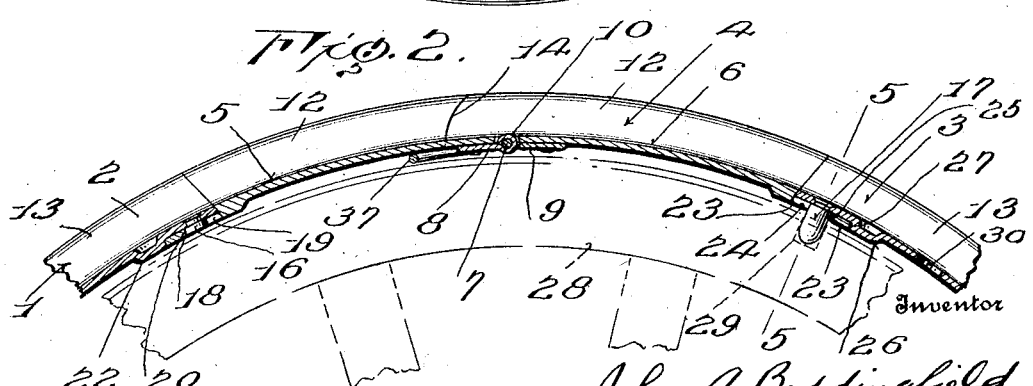

J. A. BEDDINGFIELD.
AUTOMOBILE TIRE RIM.
APPLICATION FILED MAR. 7, 1921.
1,408,165. Patented Feb. 28, 1922.
2 SHEETS—SHEET 2.
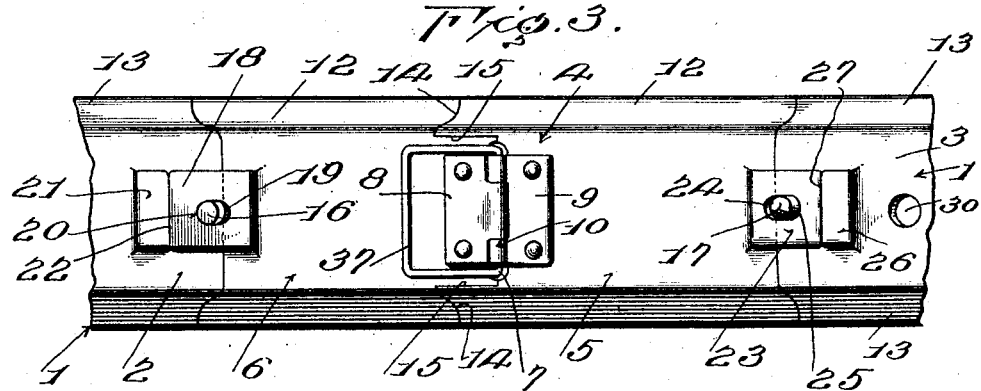
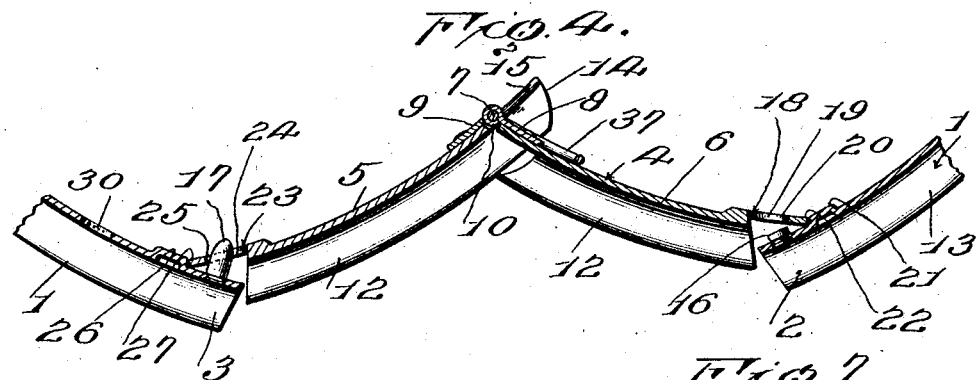
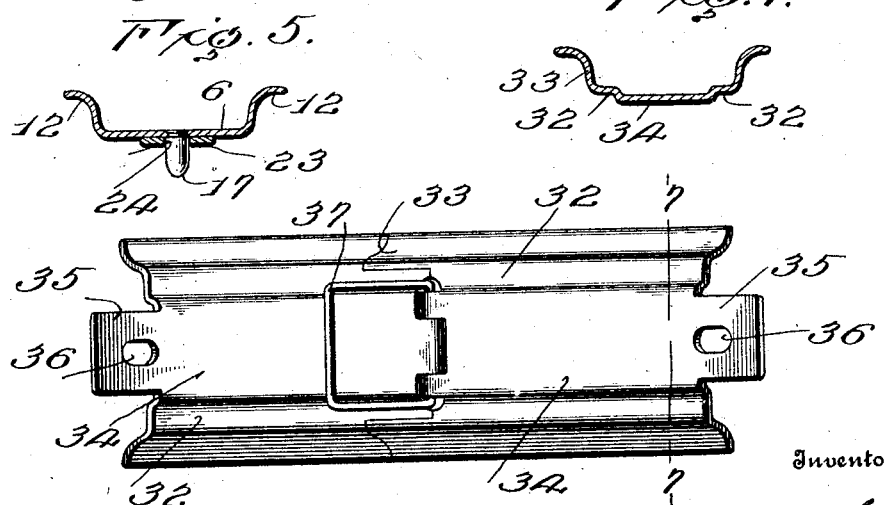
Inventor
John A. Beddingfield
By Helge Murray
his Attorney

UNITED STATES PATENT OFFICE.

JOHN A. BEDDINGFIELD, OF FORT VALLEY, GEORGIA.

AUTOMOBILE TIRE RIM.

1,408,165.  Specification of Letters Patent.  Patented Feb. 28, 1922.

Application filed March 7, 1921. Serial No. 450,290.

*To all whom it may concern:*

Be it known that I, JOHN A. BEDDINGFIELD, a citizen of the United States, residing at Fort Valley, in the county of Houston and State of Georgia, have invented certain new and useful Improvements in Automobile Tire Rims, of which the following is a specification.

This invention relates to automobile tire rims, and contemplates more particularly a locking device for use on rims of a type set forth in U. S. Letters Patent No. 1,345,659 granted to me July 6, 1920.

An object of this invention is to produce an automobile rim provided with a detachable rim section and means for securing said detachable rim section within the gap of the rim and preventing any lateral movement thereof, or stretching or contraction of the rim.

Another object of the invention is to provide an automobile rim, the detachable rim section of which is firmly retained in position to complete the rim by co-acting locking devices provided at the joints of the rim.

A further object of this invention is to produce an automobile rim provided with a detachable rim section, and means for locking the said rim sections together, said locking means also serving to locate and retain the rim upon the wheel.

A still further object of this invention is the production of a rim formed with a detachable section, the ends of said rim and detachable section being abutted in a plane at an angle to the radii of the rim for effecting the circumferential retention of the detachable rim section and cooperating with locking means for maintaining a maximum uniform support for the tire.

The invention further consists in the construction and arrangement of the several parts hereinafter described and pointed out in the appended claims.

In the accompanying drawings wherein I have shown an embodiment of my invention and in which similar reference characters designate corresponding parts in the several views:

Fig. 1 is a view partly in section, illustrating my improved rim as applied to an automobile wheel;

Fig. 2 is an enlarged vertical sectional view showing the detachable rim section locked in position within the open portion of the cap in the non-collapsible rim section, the rim being shown as located and held in place upon the wheel, the latter being illustrated in dotted lines;

Fig. 3 is a plan view of the detachable rim section and locking means therefor looking toward the inner face of the rim;

Fig. 4 is a vertical sectional view illustrating the position of the detachable rim section when being removed or positioned within the gap for completing the rim;

Fig. 5 is a detail cross sectional view on the line 5—5 of Fig. 2;

Fig. 6 is a plan view of a modified form of detachable rim section looking toward the inner face thereof; and Fig. 7 is a detail cross sectional view on the line 7—7 of Fig. 6.

The present invention has been designed with a view to providing means for more effectively retaining the detachable rim section in place within the gap or open portion of the rim, and thereby preventing any lateral or side motion, as well as possible stretching or contraction of the rim incident to its use. Generally stated, my invention comprises a relatively permanent or non-collapsible rim section having an interrupted portion or gap therein, and a detachable rim member or toggle section adapted to be fitted into said gap for completing the rim, said collapsible member being formed with an intermediate hinge and having end portions angularly associated with the ends of the non-collapsible rim section for maintaining the circumferential contour of the rim, and co-acting locking devices provided at each joint for positively attaching the free ends of the detachable rim section to the ends of the non-collapsible rim section. Any one of the locking devices performs the further function of securing the rim to the wheel.

Referring to the drawings, the relatively permanent or non-collapsible rim section 1 is provided with an open segmental portion or gap between the ends 2 and 3 thereof for the reception of the collapsible rim section 4.

The collapsible or detachable rim section 4 is formed of members 5 and 6 held together intermediate their ends by means of the pivotal or hinge connection 7, the latter being preferably arranged at a point approximating the base of the rim. The hinge connection 7 may be formed of the complementary hinge members 8 and 9 provided on the members 5 and 6, and these hinge members may be riveted as shown, welded, formed integral therewith, or otherwise secured. The loop ends or bearings for the pivot pin 10 may be also varied, and I do not limit myself to the exact arrangement shown.

Each hinge member 5 and 6 is provided with annular side flanges 12 forming continuations of the annular side flanges 13 formed on the rim section 1. The inner ends of the annular side flanges 12 are preferably designed to meet on a curve or arc indicated at 14 (see Fig. 1), the said curve or arc being struck from the center of the hinge or pivotal connection 7 and at a suitable distance therefrom to permit of the proper collapse of the hinge members as shown for example in Fig 4.

The detail construction of this joint is set forth in companion application filed by me February 1, 1921, and bearing Serial Number 441,688. In the present disclosure this hinged co-action between the respective members 5 and 6 to provide for the continuous annular side flanges of the rim as well as the base thereof, is effected by cutting or separating the said hinge members in an offset or staggered manner as shown at 15 in Fig. 3. This form of hinge joint provides for continuous side flanges, thereby providing for a maximum degree of rigidity and strength equal to the uncut rim now in use. It will also be seen that the tire is completely supported circumferentially at all points, and protected with the same degree of security as is now obtained with the uncut rim.

The means for retaining the detachable rim section 4 in position includes a construction wherein the outer ends of the hinge members 5 and 6 are cut at an angle with respect to the radii of the wheel as indicated by the dot and dash lines $a$ and $b$ in Fig. 1. The respective ends 2 and 3 of the non-collapsible rim section may be correspondingly cut, and the joint produced is one of rigidity and permanency equal in tire supporting strength to the uncut rim. The degree of the angle may be varied to more effectively distribute the pressure with the least possible strain upon the joint. It will also be understood that the angle may be varied according to the length of the collapsible segmental portion of the rim, and I do not limit myself to the exact showing set forth.

In practice it has been found desirable to lock the free ends of the detachable rim section to the respective ends 2 and 3 of the non-collapsible rim section, thereby preventing any possible dislodgment or movement of the rim sections with relation to the wheel, or to each other. The locking means illustrated in this present embodiment of my invention comprises studs or projecting pins 16 and 17 carried respectively by the ends 2 and 3 of the non-collapsible rim section. These studs are shown as projecting inwardly of the rim and are riveted thereto near the respective ends 2 and 3. It will be understood, however, that these studs or projections may be secured to the ends 2 and 3 in any other desired manner, or may be formed integral therewith.

The stud or projecting pin 16 is arranged for interlocking co-action with an extending lug or projection 18 carried by the hinge member 6. An opening 19 is formed in this projection or lug 18 and is designed to receive the stud 16. When in position with the angular ends of the detachable rim section and non-collapsible rim section abutted, the stud 16 snugly fits against the end shoulder 20 formed by the opening 19. A lug 21 is provided on the end 2 of the non-collapsible rim section and has abutted thereagainst the extreme end 22 of the projection or lug 18. The lug 21 may be formed integral with the rim section as shown, or riveted, welded, or otherwise secured as will be understood. In Fig. 2 the substantial relation of the stud 16, the shoulder 20 and lug 22 is shown when the rim is in assembled position. It will be seen that a relatively rigid locking connection is provided wherein circumferential expansion or contraction is prevented, as well as any tendency of the detachable member to slip or move laterally from the non-collapsible rim section.

The stud or projecting pin 17 carried by the end 3 of the non-collapsible rim section, is arranged for interlocking co-action with an extending lug or projection 23 provided on the hinge member 5. An opening 24 is provided on the lug 23 and is designed to receive the stud 17. The shoulder 25 formed by the opening 24 is arranged for co-action with one side of the stud 17, similarly to the aforesaid arrangement of shoulder 20 and stud 16. When the respective angular ends of the hinge member 5 and end 3 are abutted with the detachable rim section in place, the shoulder 25 snugly fits against the pin 17. Provided on the end 3 is a lug 26, the said lug being arranged for co-action with the extreme end 27 of the lug or projection 25. This lug 26 may be formed integral, riveted, welded, or otherwise secured to the rim section, and cooperates with the interlocking of the detachable rim section in place as shown in Fig. 2. By this construction a rigid joint is likewise formed between the hinge member 5 and end 3, the said parts being interlocked and held against lateral or side movement, and circumferential expansion or contraction.

In addition to forming the interlocking connection at this joint, the stud or pin 17 is formed of a length suitable for engaging the rim or felloe portion 28 of the wheel. The pin 17 is designed to fit within an opening 29 formed in the felloe 28 as shown in Figs. 1 and 2. The end of this pin may be slightly rounded as shown to facilitate engagement. By this construction it is possible to eliminate the usual holding or retaining lugs or pins now provided and in use, this single pin serving to locate and effectively retain the rim in position.

An opening 30 is provided in the end 3 of the non-collapsible rim section. This opening is designed to receive the usual valve and enclosing stem indicated by the numeral 31 in Fig. 1. The relative location of this opening together with the arrangement of the interlocking and retaining stud 17 has been found in practice to facilitate the ready positioning of the rim upon the wheel.

In the form of detachable rim section shown in Figs. 6 and 7, the hinge members 32 and 33 are formed with an intermediate pressed base or strip 34 extended longitudinally to form the projecting lugs 35. These lugs are provided with openings 36, which may be elongated, as is also the case with openings 19 and 24 hereinbefore referred to.

In use the tire is put on and the detachable rim section fitted in place by positioning the respective ends 22 and 27 of the hinge members against the co-acting lugs 21 and 26 provided on the respective ends 2 and 3 of the non-collapsible rim section. This position or assembly is illustrated in Fig. 4, wherein the rim has been revolved and the gap or open portion brought to the bottom or ground level. As shown the stud or pin 17 is projecting through the opening 24, and the relatively shorter stud 16 is positioned for engagement within the opening 20. Pressure is now applied to the collapsible rim section 4, and the hinge members 5 and 6 are forced into place, the respective projections or lugs 18 and 23 fitted over the associated studs 16 and 17, and the respective shoulders 20 and 25 and cooperating lugs engaging as best shown in Fig. 2. When interposing the detachable rim section 4, it will be seen that the respective lugs 21 and 26 carried by the ends of the non-collapsible rim sections, serve to limit and position the hinge members 5 and 6 for rapid assembly. It will be understood that the pressure used in forcing or snapping the collapsible member in place may be applied by the foot or in any other manner.

The rim with the tire in place now may be readily positioned upon the wheel by dropping the pin or stud 17 into the opening 29 formed in the felloe 28.

In taking the tire off, the tube is deflated and the collapsible section is removed by dropping the rim or otherwise jarring the same. To facilitate the removal of the detachable rim section a handle or similar device 37 may be provided, and the rim section forcibly pulled from between the ends 2 and 3 of the rim section 1.

In the present embodiment of my invention the handle 37 is formed as an extension of the pivotal pin or connection 7. It is in the nature of a loop or bail as shown, although it will be understood that the handle may be of any other form and can be attached to the detachable rim section in any other manner. The provision of this handle serves to permit of the ready release of the detachable rim section as distinguished from dropping the rim or forcing the same. It will also be seen that this handle which if carried by the rim section can be snugly fitted against the rim when positioning the same upon the wheel. This handle, and more especially the pivot pin portion 7 thereof, I prefer to make of brass or other non-rust accumulating material.

The rim may be made of any desirable material such as malleable steel, for example, due regard being had for such spring-like tendencies as may be manifested by the ends 2 and 3 of the rim section 1. Other various changes in construction, arrangement and material, however may be effected to produce additional advantages and beneficial results.

I claim:

1. A tire supporting rim comprising a section having an open portion or gap therein, a detachable rim section for said gap arranged to operate as a toggle and having free ends extending into and secured within the aforesaid open portion for completing the rim, and coacting devices spaced from the extreme free ends of the detachable rim section and the open ends of the first mentioned section for positively locking the said sections together.

2. A tire supporting rim comprising a section having an open portion or gap therein, a detachable rim section for said gap arranged to operate as a toggle, and co-acting devices for locking the detachable rim section to the first mentioned section, said co-acting devices including a pin and slot connection adapted to prevent lateral and circumferential movement of the said rim sections with respect to each other.

3. A tire supporting rim comprising a section having an open portion or gap therein, a detachable rim section for said gap arranged to operate as a toggle, co-acting devices for positively locking the detachable rim section and the first mentioned rim section together to complete the rim, and means including the said coacting devices for preventing lateral and circumferential movement of the aforesaid rim sections with respect to each other.

4. A tire supporting rim comprising a section having an open portion or gap therein, a detachable rim section for said gap, coacting devices for locking the detachable rim section and the first mentioned section together, and means included in the aforesaid co-acting devices for engaging the felloe of the wheel for retaining the rim thereon.

5. A tire supporting rim comprising a section having an open portion or gap therein, a detachable rim section for said gap, co-acting devices for locking the said rim sections together, said co-acting devices including a pin and slot connection, and means including the aforesaid pin for locating and retaining the rim upon a wheel.

6. A tire supporting rim comprising a section having a valve opening and provided with an open portion or gap near said opening, a detachable rim section for said gap, co-acting devices for locking the said sections together within the gap for completing the rim, and means carried by one of the locking devices for retaining the completed rim to the wheel, said means being located near the aforesaid valve opening to facilitate the rapid location and positioning of the rim upon the wheel.

7. A tire supporting rim comprising a section having an open portion or gap therein, a detachable rim section for said gap arranged to operate as a toggle, securing devices projecting from the rim near the open end portions of the first mentioned rim section, and coacting devices carried by the free ends of the detachable rim section adapted to engage the aforesaid projecting devices and interlock the rim sections against lateral and circumferential movement with respect to each other.

8. A tire supporting rim comprising a section having an open portion or gap therein, a detachable rim section for said gap arranged to operate as a toggle, securing devices projecting from the rim near the open end portions of the first mentioned rim section, coacting devices carried by the free ends of the detachable rim section adapted to engage the aforesaid projecting devices and interlock the rim sections together, and means against which the extreme free ends of the detachable rim section are abutted and held when forcing the toggle section into position and interlocking the aforesaid devices.

In testimony whereof I affix my signature.

JOHN A. BEDDINGFIELD.